(12) United States Patent
Atsumi et al.

(10) Patent No.: US 6,891,973 B1
(45) Date of Patent: May 10, 2005

(54) LOSSY/LOSSLESS REGION-OF-INTEREST IMAGE CODING

(75) Inventors: Eiji Atsumi, Ofuna Kamakura (JP); Nariman Farvardin, Rockville, MD (US)

(73) Assignees: Mitsubishi Electronic Corporation, Tokyo (JP); University of Maryland, Collage Park, MD (US)

( * ) Notice: Subject to any disclaimer, the term of this patent is extended or adjusted under 35 U.S.C. 154(b) by 0 days.

(21) Appl. No.: 09/623,464
(22) PCT Filed: Mar. 20, 1998
(86) PCT No.: PCT/US98/03811
§ 371 (c)(1),
(2), (4) Date: Nov. 17, 2000
(87) PCT Pub. No.: WO99/49413
PCT Pub. Date: Sep. 30, 1999

(51) Int. Cl.$^7$ .................................................. G06K 9/36
(52) U.S. Cl. ........................................ 382/232; 382/240
(58) Field of Search ................................. 382/232, 239, 382/240, 242, 243, 282; 358/537–539, 1.15; 375/240.11, 240.18, 240.19

(56) References Cited

U.S. PATENT DOCUMENTS

| | | | | |
|---|---|---|---|---|
| 5,412,741 A | * | 5/1995 | Shapiro | 382/232 |
| 5,563,960 A | | 10/1996 | Shapiro | 382/239 |
| 5,586,200 A | | 12/1996 | Devaney et al. | 382/232 |
| 5,748,876 A | | 5/1998 | Hardy | 714/25 |

* cited by examiner

Primary Examiner—Leo Boudreau
Assistant Examiner—Duy M. Dang
(74) Attorney, Agent, or Firm—Squire, Sanders & Dempsey L.L.P.

(57) ABSTRACT

A method and apparatus for encoding digital image data wherein region of interest can be specified either before the encoding process has begun or during the encoding process (127), such that the priority of the encoder outputs are modified so as to place more emphasis on the region of interest, therefore increasing the speed and/or increasing the fidelity of the reconstructed region of interest. The system, therefore, enables more effective reconstruction of digital images over communication lines (128).

9 Claims, 7 Drawing Sheets

LOSSY/LOSSLESS REGION-OF-INTEREST IMAGE CODING

BACKGROUND OF THE INVENTION

1. Field of the Invention

Modem computers and modem computer networks enable the transfer of a significant amount of information between computers and between a computer and a storage device. When computers access local storage devices such as a local hard drive or local floppy drive, significant amounts of information can be quickly accessed. However, when seeking to access data from a remote storage location such as over a wide area network (WAN) or the internet, data transfer rates are significantly slower. Transferring large files, therefore, takes significant amounts of time. Additionally, storage of large files utilizes valuable and limited storage space. Photographic images and similar graphical images typically are considered to be large files, since an image conventionally requires information on each picture element or pixel in the image. Photographs and similar graphical images, therefore, typically require over one megabyte of storage space, and therefore require significant transmission times over slow network communications. In recent years, therefore, numerous protocols and standards have been developed for compressing photographic images to reduce the amount of storage space required to store photographic images, and to reduce transfer and rendering times. The compression methods essentially create mathematical or statistical approximations of the original image.

Compression methods can broadly be categorized into two separate categories: Lossy compression methods are methods wherein there is a certain amount of loss of fidelity of the image; in other words, close inspection of the reproduced image would show a loss of fidelity of the image. Lossless compression methods are ones where the original image is reproduced exactly after decoding. The present invention is directed to an efficient image compression method and apparatus wherein part of an image can be compressed with a higher level of fidelity in the reproduced image than other parts of the image, based on a selection of a region-of-interest by the user who is initially encoding or compressing the image, or the user who receives and decodes the image data through interaction with the encoding side.

2. Description of the Related Art

A currently popular standard for compressing images is called the JPEG or "J-peg" standard. This standard was developed by a committee called The Joint Photographic Experts Group, and is popularly used to compress still images for storage or network transmission. Recent papers by Said and Pearlman discuss new image coding and decoding methods based upon set partitioning in hierarchical trees (SPIHT). See Said and Pearlman, Image Codec Base on Set Partitioning In Hierarchical Trees, IEEE Transactions on Circuits and Systems for Video Technology, vol. 6, no. 3, June 1996, and Said and Pearlman, Image Multi-Resolution Representation, IEEE Transactions on Image Processing, vol. 5, no. 9, September 1996. The contents of these papers are hereby incorporated by reference. These references disclose computer software which, when loaded and running on a general purpose computer, performs a method and creates an apparatus which utilizes integer wavelet transforms which provide lossy compression by bit accuracy and lossless compression within a same embedded bit stream, or apparatus which utilizes non-integer wavelet transforms which provide lossy compression by bit accuracy within a single embedded bit stream. An image which is initially stored as a two dimensional array representing a plurality of individual pixels prioritizes bits according to a transform coefficient for progressive image transmission. The most important information is selected by determining significant or insignificant elements with respect to a given threshold utilizing subset partitioning. The progressive transmission scheme disclosed by Said and Pearlman selects the most important information to be transmitted first based upon the magnitude of each transform coefficient; if the transform is unitary, the larger the magnitude, the more information the coefficient conveys in the mean squared error (MSE, $D_{rinse}(\ )$) sense; where (i,j) is the pixel coordinate, with p, therefore representing a pixel value. Two dimensional array c is coded according to $c=\Omega(p)$, with $\Omega(.)$ being used to represent a unitary hierarchical subband transformation. Said and Pearlman make the assumption that each pixel coordinate and value is represented according to a fixed-point binary format with a relatively small number of bits which enables the element to be treated as an integer for the purposes of coding. The reconstructed image is performed by setting a reconstruction vector $\hat{c}$ to 0, and calculating the image as:

$$\hat{p} = \Omega^{-1}(\hat{c})$$

N is the number of image pixels, and the above calculation for mean squared-error distortion can therefore be made. Using mathematical assumptions, ft is known that the mean squared-error distortion measure decreases by $|c_{i,j}|^2/N$. This fact enables pixel values to be ranked according to their binary representation, with the most significant bits (MSBs) being transmitted first, and also enables pixel coefficients with larger magnitude to be transmitted first because of a larger content of information. An algorithm is utilized by the encoder to send a value representing the maximum pixel value for a particular pixel coordinate, sorting pixel coordinates by wavelet transform coefficient values, then outputting a most significant bit of the various coefficients, using a number of sorting passes and refinement passes, to provide high quality reconstructed images utilizing a small fraction of the transmitted pixel coordinates. A user can set a desired rate or distortion by setting the number of bit to be spent in sorting passes and refinement passes. Utilizing a spatial orientation tree, as shown in FIG. 1, pixel information is separated into a List of Insignificant Sets (LIS), a list of Insignificant pixels (UP), and a List of Significant Pixels (LSP). FIG. 1 illustrates image 100, with a plurality of pixel sets 101, 102, . . . , 10× therein. The spatial orientation tree is developed as known in the art, by decomposition of integer-valued or non-integer-valued wavelet transform (WT) coefficients. Coefficients in the LH subband of each decomposition level forms the spatial orientation tree. In this example, parent node 101 has a series of roots and offspring nodes 102–107. The LIP is a list of coordinates of insignificant pixel or WT coefficients, the LIS is a list of coordinates of tree roots with insignificant descendent sets, with multiple types of entries on the list (Type A and Type B), and the LSP is a list of coordinates of significant pixels. Sorting and partitioning of the list contents is performed as illustrated in FIG. 2. The significance determination which is made in the flow chart of FIG. 2 is based upon a given significance threshold entries from the LIP which are determined to be significant at 202 LSP, 203, and entries which are determined not to be significant at 202 are returned to the LIP for testing during subsequent passes. If it is determined that all LIP entries have been tested at 204, then LIS entries begin to be tested. If all LIP entries are not tested, a next LIP entry is tested for significance at 202. Assuming all LIP entries are tested, LIS entries at 205 are tested at 206 to determine whether the LIS entries are type A, which are sets of coordinates of descendants of a node, or type B if the entry represents a difference between coordinates of descendants and offspring. If the sets are determined to be type A, significance is tested at 207. If significant, the set is partitioned at 208 into offspring and descendants of offspring with offspring being tested for significance at 209. If significant, the coordinate is placed on the LSP. If insignificant the tested offspring is moved to the end of the LIP. If the initial type A entry is determined to be insignificant at 207, the entry is returned to the LIS. Type B LIS entries are tested for significance at 210, and moved to the LIP If significant or returned to the LIS if insignificant. After each test for significance, a one is output if the entry is determined to be significant, and a zero is output if the entry is determined to be insignificant. The ones and zeros are used to indicate when a specified number of bits have been output for termination purposes. Decoding occurs in a same, but reversed fashion. Entries of each list are identified by the pixel coordinates, with the LIP and LSP representing individual pixels, and the LIS representing sets of coordinates, with the sets of coordinates being grouped according to their status as either coordinates of a descendent of a node of the spatial orientation tree.

Using the encoding algorithm mentioned above, sorting passes are performed until reaching the selected termination point, with an increase in sorting passes providing a decrease in distortion due to further refinement provided by more accurate significance classification. Increased sorting passes, however, requires additional time. The decoder duplicates the encoder's execution path in reverse to sort the significant coefficients, with "outputs" being changed to "inputs"for decoding, to recover appropriate ordering information. The coding method of the prior art, therefore, attempts to mathematically determine an area of the image which should have a higher fidelity or lower loss than areas of the image based upon the significance determinations. FIG. 3 illustrates an important aspect of the SPIHT coding, which is repetitive sorting passes and refinement passes for a given threshold; sorting and refinement is repeated until encoding is complete. (Refer to the above-referenced articles for a more complete discussion of SPIHT coding).

SUMMARY OF THE INVENTION

The present invention, however, is directed to an image encoding and decoding method and apparatus which enables a user to set a region-of-interest (ROI) for higher fidelity or lower loss compression than other areas of the image. The invention incorporates a new feature for ROI coding without compromising any capabilities of the image coding method into which the ROI coding is incorporated, such as progressive by fidelity, progressive by resolution, progressive by fidelity and resolution, and lossy/lossless capabilities. Furthermore, computational complexity increase due to the implementation of the invention is minimal. The encoder output according to the prior art is a bit stream with a sequential series of bits which is ordered to reduce the overall mean squared error. The invention is a method and apparatus which modifies the ordering of the bit stream output such that additional emphasis is placed on the region of interest, than other aspects of the image. In applications such as medical imaging or virtually any other type of imaging, the region of interest may not be the pixel values having the highest-ordered coefficients in a sense of reducing the MSE. The present invention, therefore, enables a user at a transmitting end or receiving end to select an appropriate region of interest which is reconstructed possibly losslessly and with a higher fidelity than the rest of the image, regardless of the importance of the region of interest in the MSE sense.

BRIEF DESCRIPTION OF THE DRAWINGS

For a more detailed understanding of the operation of the invention, reference should be made to the attached drawings, wherein.

DETAILED DESCRIPTION OF THE PREFERRED EMBODIMENT

The present invention is directed to a method and apparatus of performing still image compression wherein either a user at the transmitting side can specify what is, in his or her opinion, a region-of-interest before the encoding process, or wherein a user on the receiving side can determine the region of interest based upon the incoming bit stream and identify the desired area to place more emphasis on the region of interest during the remainder of the encoding process. In the first situation, wherein a user on the transmitting side is determining the ROI, encoding can be performed off-line. When a user on the receiving side is identifying the ROI, encoding must be performed online.

Figure 1:
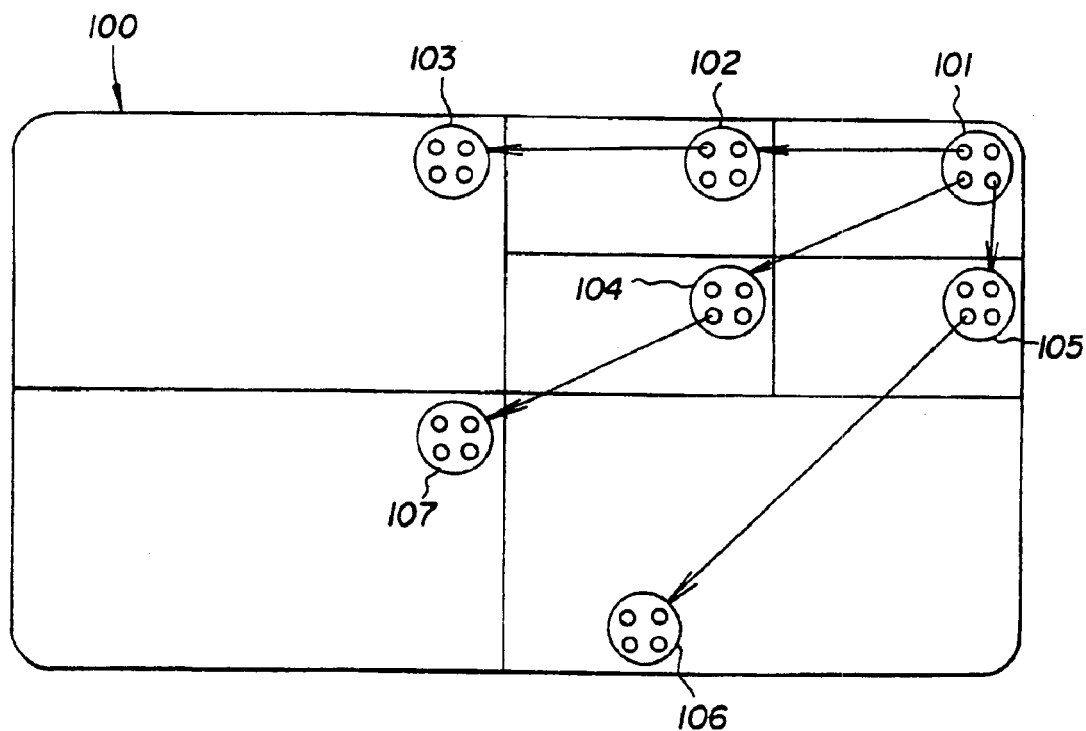
FIG. 1 illustrates an aspect of a spatial-orientation tree, according to the prior art.
Figure 2:
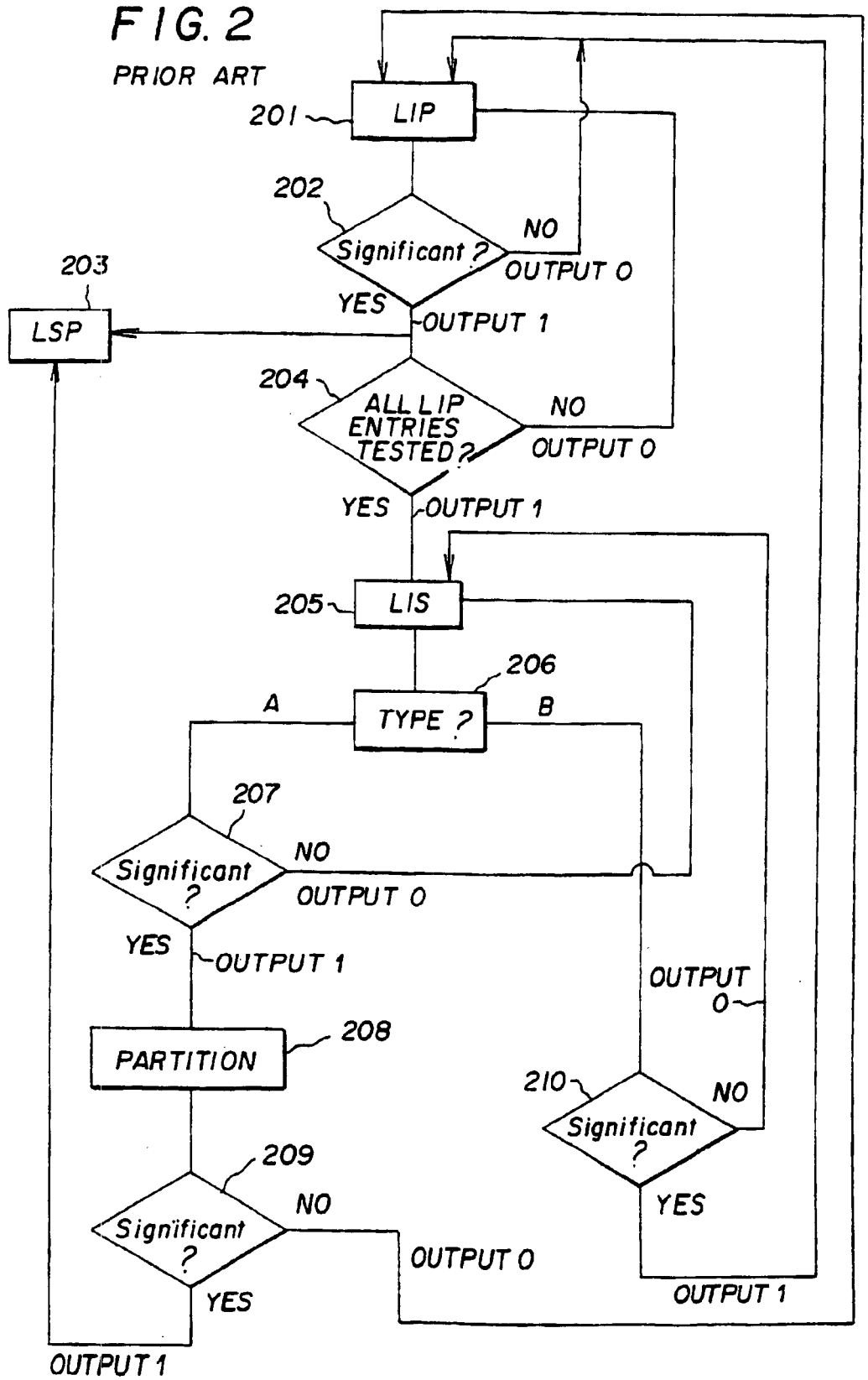
FIG. 2 is a flow chart which illustrates a brief explanation of SPIHT compression according of the prior art.
Figure 3:
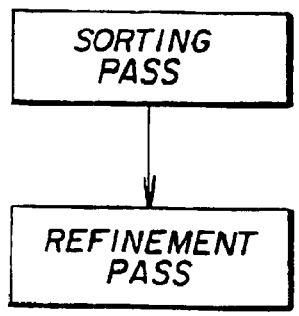
FIG. 3 is a summarization flow chart which illustrates the prior art.
Figure 4:
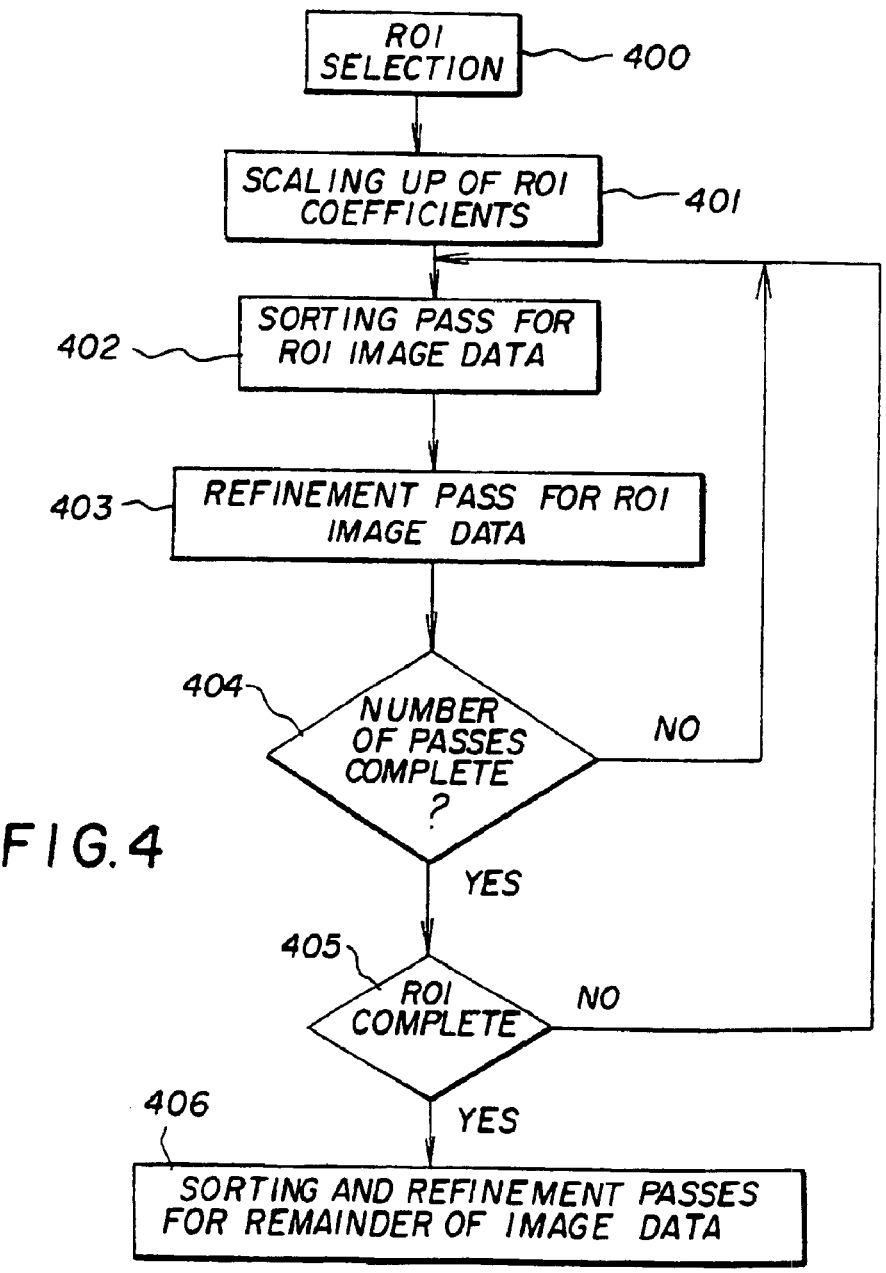
FIG. 4 is a flow chart which explains region-of-interest image coding according to the present invention.

When the ROI is identified, only wavelet transform (WT) coefficients corresponding to the data in the ROI are scaled up by the compression method or algorithm. The compression method can be, for example, the SPIHT method of Said and Pearlman; for the purposes of this description, the SPIHT method will be referred to as an example, but this invention is not to be interpreted as being limited to SPIHT applications. The scaling up discussed previously is performed by the selected coefficients being given higher priority through a fixed number of left bit shifts, with each left bit shift corresponding to a scaling up or increase in bit significance by a factor of two in each subband. The larger number of left shifts, the higher the emphasis will be on the WT coefficients, and the more noticeable will be the speed increase of the ROI reconstruction. The encoder or decoder according to the invention, therefore, can select the region of interest, and dictate the speed with which the region of interest is reconstructed, or the amount of additional emphasis the region of interest receives with respect to the rest of the image. Referring to the invention as illustrated in FIG. 4, using an SPIHT type of compression method, a sorting pass is a process beginning with an initial value or threshold of n=N. The method requires N+1 passes to encode the entire image up to the highest fidelity (losslessly when the wavelet decomposition is carried out through integer transform). After completing P passes (P=0, 1, . . . , N) of the encoding method, and transmitting the resulting output, the encoder or decoder identifies the region of interest and the appropriate WT coefficients are left shifted by S bits. It should be noted that P=0 corresponds to the case where the region of interest is determined by the encoder. Large values of S, therefore, result in a speedy lossless reconstruction of the region of interest Lower values of S result in a less significant speed increase with respect to the reconstruction of the region of interest, but result in a better reconstruction of the remainder of the image, or provide a better overall rate-distortion performance. By controlling the value of S, therefore, the user can control the level of importance of the region of interest relative to the remainder of the image.

FIG. 4 illustrates the ROI coding of the present invention in a compression method such as SPIHT. Either before or during encoding, ROI selection occurs at 400. After ROI selection, the ROI coefficients are scaled up at 401, for a given threshold level. Sorting passes and refinement passes are performed on the ROI image data at 402 and 403, respectively. At 404, it is determined whether or not the number of passes are complete based upon the given threshold levels. If the number of passes are not complete, further sorting and refinement occurs. If the number of passes is complete, then it is determined at 405 whether the ROI data has been completely reconstructed. If not, appropriate sorting and refinement occurs for subsequent ROI image data. If the ROI is complete, then sorting and refinement passes are performed on the remainder of the image data at 406. Sorting and refinement is based upon a maximum threshold level N, a threshold level k where ROI coding begins, and the left bit shift value S.

In other words, assuming that P passes are completed, the region of interest is selected along with a value of S, and the selected ROI and S value are fed back to the encoder. In situations where P=0, the encoder selects the ROI and S, and encoding can be performed off line or on-line. All WT coefficients relating to the region of interest (ROI coefficients) are then identified, and left shifted by S bits. The current significance threshold n is increased from the current value (N–P) to (N–P+S). Encoding is then resumed on ROI coefficients, and continued for S passes until the significance threshold n=N–P. Encoding is continued on all WT coefficients until threshold n<0. It should be noted that the actual shape or outline of the region of interest is arbitrary, as long as the overall region of interest can be described or defined as a plurality of adjacent rectangles or as a non-adjacent collection of pluralities of adjacent rectangles. The region of interest can be a single region of interest, or there can be a plurality of regions of interests which can be handled in the same manner discussed herein.

In other words, once a region-of-interest is selected, WT coefficients associated with reconstruction of the region of interest are identified in the wavelet transform domain, and only these WT coefficients are encoded/decoded according to a compression method which becomes modified to concentrate on encoding/decoding of the specified coefficients. Corresponding coefficients, therefore, are encoded/decoded at an earlier threshold cycle or earlier path than the highest priority coefficients according to the compression method such as the SPIHT. ROI coefficients are identified through tracing back of the inverse wavelet transform from the image domain to the WT coefficient-domain. Inverse wavelet transformation converts image representation in the WT coefficient domain into image data in the image domain. One pixel in the image is reconstructed with a couple of WT coefficients through inverse wavelet transformation. Therefore, once the region-of-interest is specified in the image domain, WT coefficients pertaining thereto, noted as ROI coefficients, are identified by tracing back the inverse wavelet transform from the image domain to the WT domain.

The left-shifting discussed above refers to scaling the WT coefficients by a left bit shift, which corresponds to scaling by 2, 4, 8, etc., in accordance with known binary shifting. A conventional method such as the SPIHT coding algorithm handles the WT coefficients from the highest non-zero bit fields of all coefficients (MSB), to the least significant bit (LSB). Scanning all coefficients in sequential bit depth from the MSB to the LSB as a path results in information ordering being achieved in a comparable manner. Coding the region-of-interest according to the present invention orders information by scaling up the WT coefficients pertaining to the region of interest such that they are handled or visited in an earlier path or cycle, thereby placing the ROI coefficients in an earlier portion of the encoding bit stream. The larger the left bit shift, the earlier in the bit stream the ROI coefficients are placed. Therefore, the higher the left shift value, the higher the speed of reconstruction of the region-of-interest.

When a region-of-interest is reconstructed in a lossless manner, there is no objective or subjective loss in the reconstructed region-of-interest. The amount of losslessness of the image reconstruction is based upon the wavelet transform with which the compression method generates the encoding bit stream. The encoding bit stream generates images of a wide variety of bit rates, including ones which assure losslessness of the overall image. However, if the encoding or decoding process is terminated before losslessness is assured, the reconstruction is to be considered a "lossy" reconstruction. The lower the bit rate at which the coding process is terminated, the more lossy the reconstruction result will be. Therefore, if the coding for the region of interest coefficients are terminated early, the reconstruction results of the region-of-interest would also be lossy, although with a higher level of emphasis than areas outside of the region-of-interest.

It should be noted that even when the wavelet transform is not an integer-to-integer mapping type of wavelet transform, such as a float-to-float mapping type of integer transform which is commonly called subband decomposition, QMF, etc, the region-of-interest coding according to the present invention works in the same manner as discussed above, with the exception of the fact that the reconstructed result can never be considered to be lossless, due to the fact that the wavelet transform and quantization associated therewith generates some loss which can never be recovered. However, with this type of wavelet transform if it is assumed that the quantization result of the wavelet transform coefficients correspond to the original information in the image, then the ROI coding system of the present invention could be considered to be lossless in this configuration. However, if real losslessness cannot be achieved for non-integer wavelet transform methods, the claimed method can be considered a highest fidelity coding method instead of a lossless coding method unless integer-transform is used.

Figure 5:
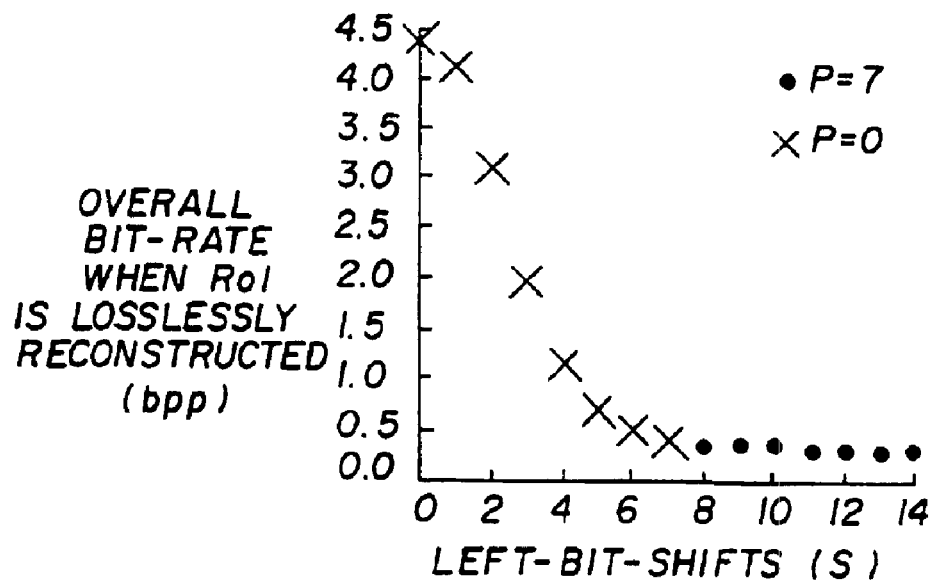
FIG. 5 is a graph which illustrates the speed of lossless reconstruction as a function of left-bit-shifts according to the present invention.
Figure 6:
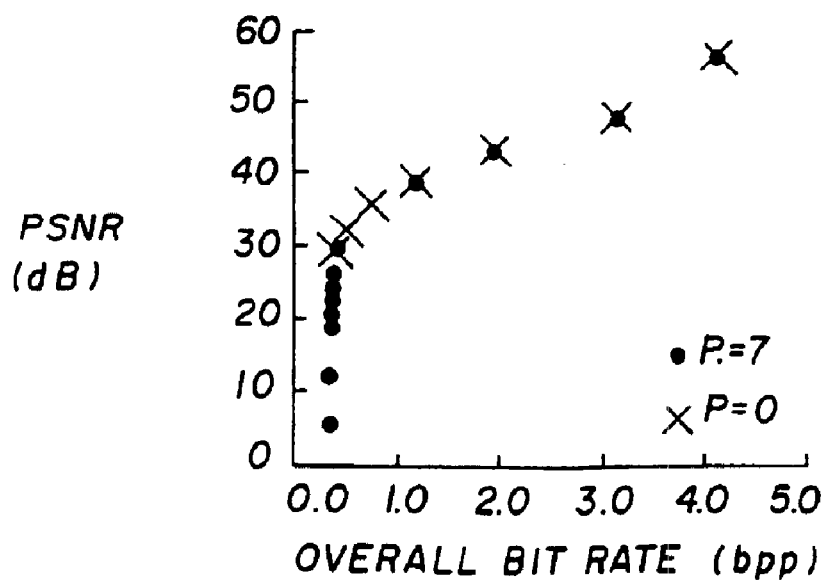
FIG. 6 illustrates the PSNR performance of the present invention.
Figure 7:
FIG. 7 illustrates a result of the invention utilizing particular reconstruction rates.
Figure 8:
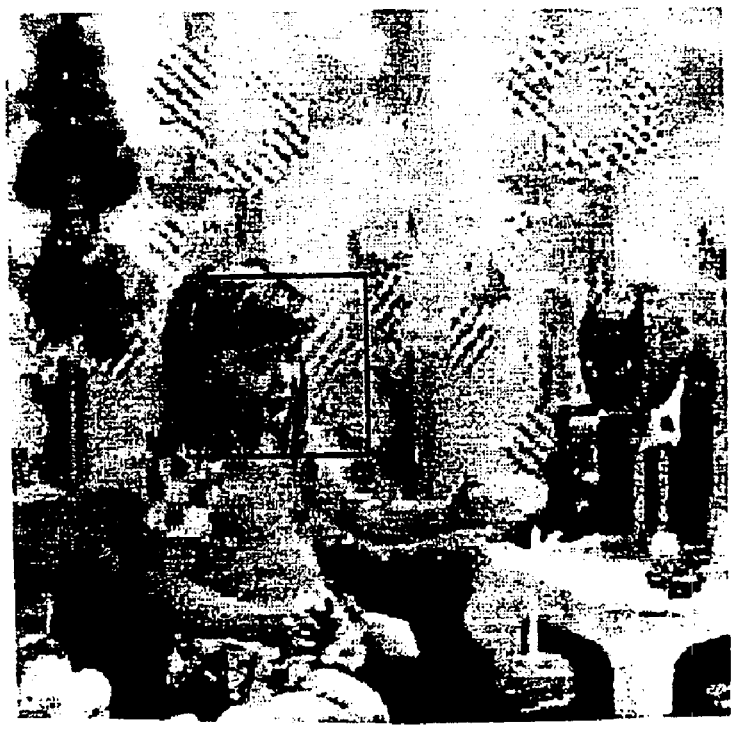
FIG. 8 is a photo of a lossless reconstruction of the same photo with the same region of interest as FIG. 7.

FIGS. 5 and 6 are graphs which illustrate performance results on a 512×512 image, with the region of interest illustrated by the rectangular section of FIG. 7. The region of interest is a 128×128 square containing a portion of the image. Referring once again to FIG. 5, it can be seen that the speed of lossless reconstruction of the region of interest varies as a function of the number of left shift values S. The figure illustrates results for two different values of p, those being p=0 and p=7. FIG. 6 illustrates the peak signal-to-noise ratio (PSNR) performance of reconstruction of the entire image when the region of the interest is losslessly reconstructed, again with values of p=0 and p=7. For a fixed value of P, each point corresponding to a given value of S corresponds to the reconstruction PSNR and overall bit rate when the region of interest is losslessly reconstructed. FIG. 7 is a photograph which illustrates the invention utilizing an SPIHT algorithm with a P=7, which achieves a PSNR of 28.80 dB at 0.86 bpp. FIG. 8 is a photo of a lossless reconstruction of the same photo with the same region of interest as FIG. 7, with P=7 and S=7. The PSNR of this image is 29.22 dB at 0.389 bpp. When S=5, lossless reconstruction of the region of interest can occur at 0.710 bpp, with a PSNR of 35.69 dB. When S=0 (no region of interest defined), the lossless reconstruction of the entire image is achieved at 4.378 bpp, which is approximately one order of magnitude slower than with S=7. The figures illustrate, therefore, that a region of interest coding technique according to the present invention provides an effective and flexible system for embedded ROI image encoding, with flexibility from varying levels of lossy coding all the way up to lossless ROI image coding. Lossless reconstruction of the region of interest and an effective or "subjectively lossless" reconstruction of the remainder of the image can be achieved at a bit rate of 3–4 times smaller what is needed for lossless reconstruction of the overall image.

Figure 9A:
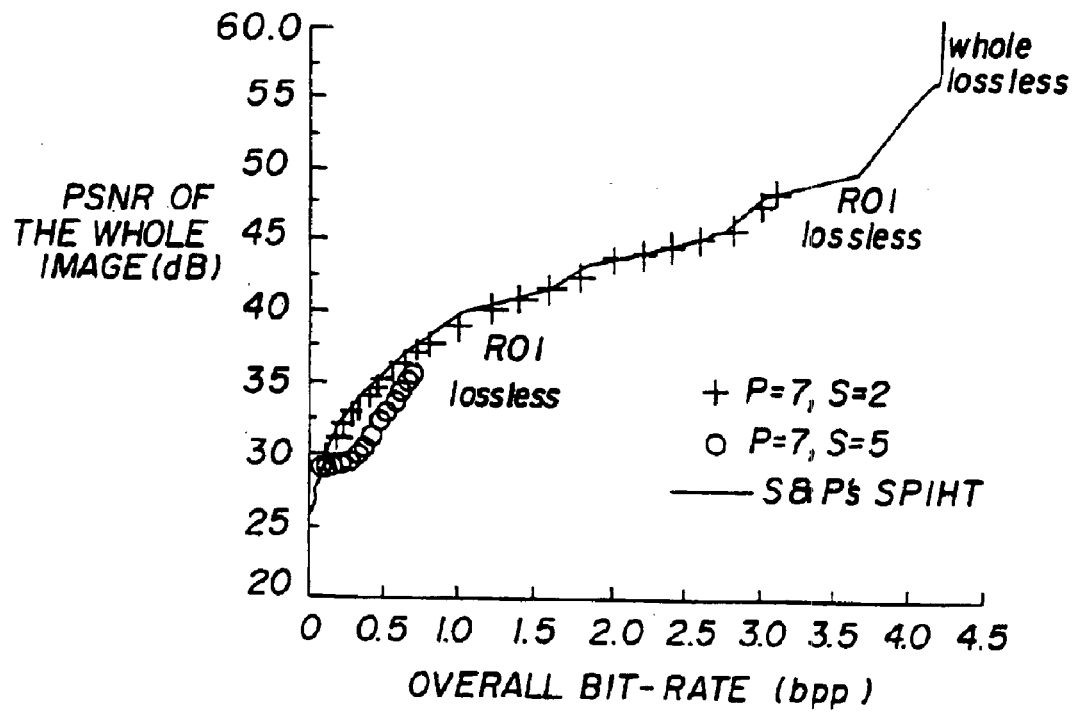
FIGS. 9A and 9B illustrate the rate-distortion penalty associated with a coding method according to the present invention.
Figure 9B:
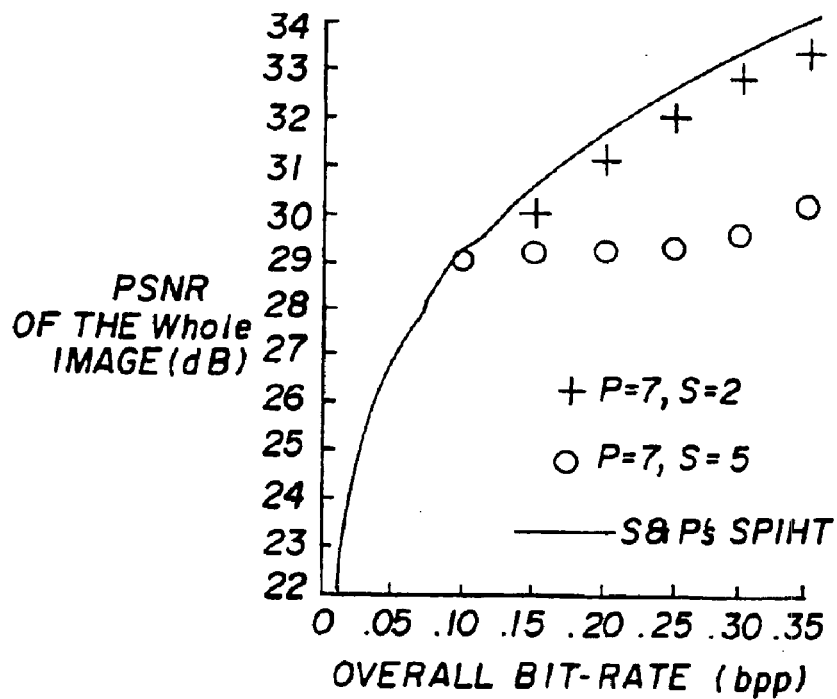

FIGS. 9(a) and 9(b) illustrate the rate-distortion penalty which is associated with a coding method and apparatus according to the present invention. These figures are graphs of the PSNR of the entire image in dB versus overall bit rate performance in bpp, for cases corresponding to P=7 and S=2, and P=7 and S=5. The solid lines indicate the performance of the conventional SPIHT algorithm, and the modified algorithms corresponding to S=2 and S=5 are indicated by the "+" and "O". It can be seen that up to a bit rate of 0.086 bpp, all three encoding schemes are identical. With a bit rate of higher than 0.086 bpp, the scheme with the larger S exhibits a larger rate-distortion loss compared to the conventional SPIHT method, but achieves a faster lossless reconstruction of the region of interest. The S=2 scheme closely corresponds to the SPIHT result.

The methods discussed above include numerous embodiments for image compression wherein the selection of the region of interest can either be performed before encoding in an off-line situation, or during encoding in an on-line manner. When the region-of-interest is selected in the middle of transmission (on-line), the selection can be performed on the receiving side wherein the receiving side sends information to the encoding or transmitting side regarding the region-of-interest, and sorting and prioritization is adjusted accordingly. The on-line selection can also be performed by the encoding side, if the encoding side includes a local decoder which simulates a decoding process before transmission or storage of the data. The invention can be embodied in a computer system comprising a display, a central processing unit, memory, and appropriate communication means such as a modem and a telephone line, which are configured to provide an input means for inputting digital image data, such that the display means can display the digital image data. The computer system can be configured to function such that a selecting device or selecting means is connected to the display for selecting the region of interest A sorting and prioritizing means or device can be connected to the selecting device for sorting and prioritizing the digital image data according to at least two priority categories, with digital image data corresponding to the region of interest having a higher priority than the digital image data which corresponds to areas outside of the region of interest. The communication circuitry or device can function as a transmitting device for transmitting the sorted and prioritized data to a remote location, with the transmitting device transmitting the digital image data corresponding to the region of interest with a higher priority than the areas outside of the region of interest. The transmitted data is received by a receiving computer which would include a receiving means or device for receiving the transmitted data, and a reconstructing device for reconstructing the transmitted data. The reconstructing device would include a decoding device for decoding the sorted and prioritized digital image data. The region of interest is reconstructed by the reconstructing device at a faster rate than the digital image data corresponding to areas outside of the region of interest. In the alternative, the region of interest can be reconstructed with a higher fidelity than areas outside of the region of interest.

The threshold or path where region of interest coding begins can be determined at the beginning of the sorting pass on and overall image or in the middle of the sorting pass, as well as in the beginning or middle of a refinement pass, or in the beginning of the entire coding process. If it is determined in the beginning of the entire coding process, this can be done in an off-line manner. ROI selection done in the beginning of a sorting or refining pass is an interactive or on-line selection. In other words, for situations where n is equal to the ROI coding level, scaling up of the ROI coefficients occurs, and sorting passes and refinement passes are performed for n=k+s; n>k; n−.

An alternative embodiment of a system according to the present invention would be one wherein the selection of the region of interest is performed based upon a partial reconstructed image which is received by the receiver after transmission from the transmitting means has begun. Based upon the partial reconstructed image, a user on the receiving end can select a region of interest, and the receiver then transmits data to the transmitting computer which identifies the selected region of interest. The transmitting computer then modifies the sorting of the digital image data based upon the selected region of interest. The digital image data corresponding to the region of interest is sorted and prioritized to have a higher priority than digital image data corresponding to areas outside of the region of interest. The modified sorted and prioritized data is then transmitted to the receiver, and the region of interest is transmitted with a higher priority than areas outside of the region of interest. The specific configuration of the computer elements to create means for performing the function specified above is within the purview of a person of skill in the art based upon the information contained in the specification.

Figure 10:
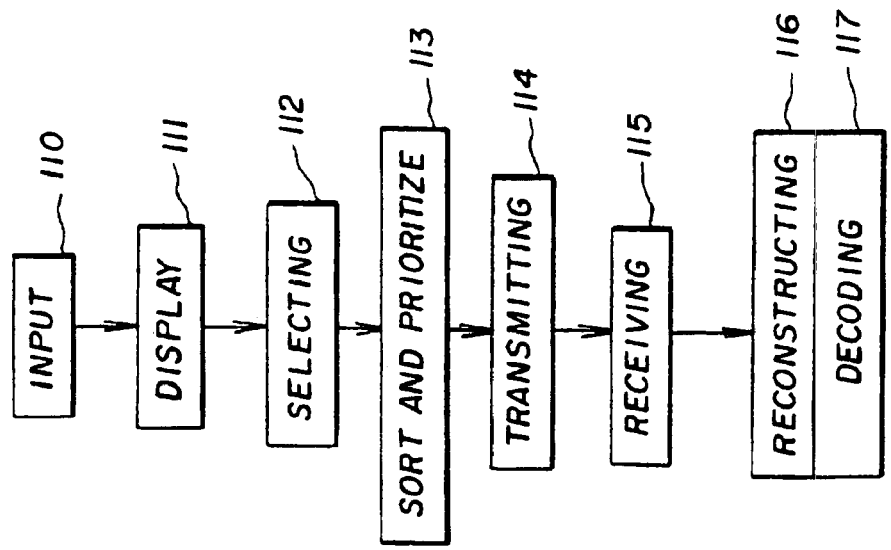
FIG. 10 is a block diagram which illustrates a series of blocks which are utilized to implement the invention wherein ROI selection is performed on the encoding side.

FIG. 10 is a block diagram which illustrates a series of elements which implement the invention wherein ROI selection is performed on the encoding side. Input means or input device 110 is used for inputting digital image data into a computer or data handling apparatus. A display means or device 111 displays the digital image data. Selecting device 112 is connected to the display device, and is used to select a region of an image represented by the digital image data. Sorting and prioritizing device 113 is connected to selecting device 112, and sorts and prioritizes the digital image data according to at least two priority categories. The selected region of interest data is given a higher priority than digital image data corresponding to areas outside of the region of interest. Transmitting device 114 transmits the sorted and prioritized data to a remote location, with the remote location being a mass storage device, a network such as an internet or intranet, wide area network, local area network, etc. The transmitted data is received by receiving device 115, wherein the transmitted digital image data is reconstructed by reconstructing means 116 having decoding means 117, wherein the region of interest is reconstructed at a faster rate and/or with a higher fidelity than digital image data corresponding to areas outside of the region of interest.

Figure 11:
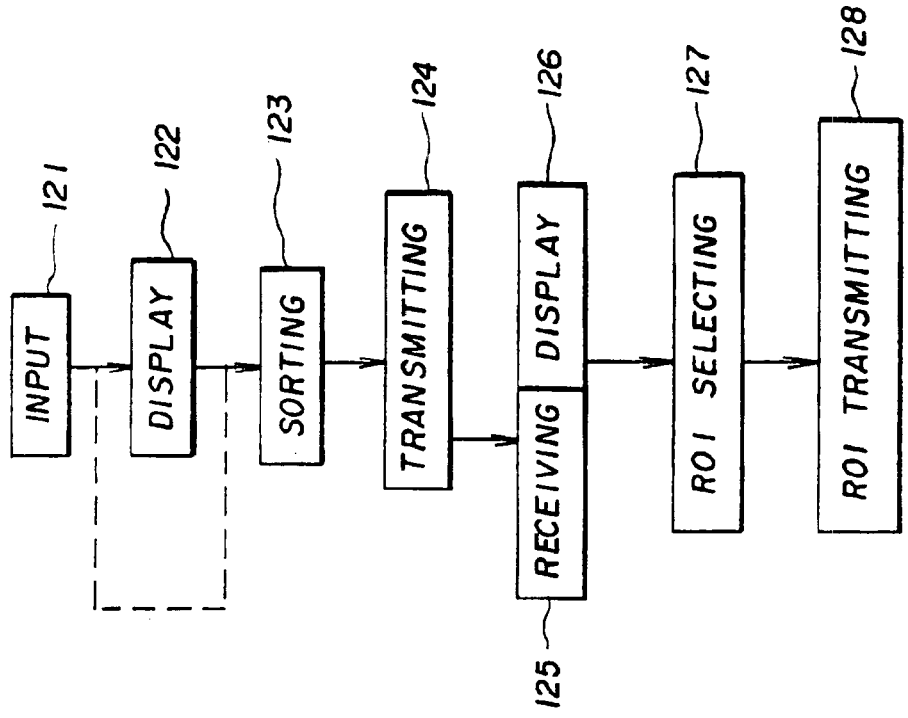
FIG. 11 is a block diagram which illustrates elements utilized to implement the invention wherein ROI selection is performed on-line.

FIG. 11 is a block diagram which illustrates region of interest selection in an on-line manner. Input means or input device 121 inputs digital image data to a computer or other image data handling apparatus. The digital image can then optionally be displayed on display means 122, or, alternatively, may be communicated directly to sorting means or sorting device 123. The sorting device sorts the digital image data according to a mathematical sorting protocol, with the digital image data being sorted and prioritized according to a predetermined prioritization formula. Transmitting means or transmitting device 124 transmits the sorted data, and the sorting means repeats a sorting of the digital image data and the transmitting means repeats a transmission of the data. The data is received on a receiving device 125, which has display device 126 connected thereupon. The display device displays the transmitted data as a partial reconstructed image during the transmission. As the sorting device and transmitting device repeat their sorting and transmission, the reconstruction of the image progresses. A region of interest selecting means 127 is connected to receiving means 125, for selecting a region of interest based upon the partial reconstructed image. After selection of the region of interest, a region of interest transmitting device or means 128 transmits data corresponding to the selected region of interest to the sorting device 123. The sorting device modifies the sorting of the digital image data based upon the data corresponding to the selected region of interest. The digital image data corresponding to the selected region of interest is sorted and prioritized by the sorting device to have a higher priority than digital image data corresponding to areas outside of the selected region of interest.

The present invention takes the form of a computer program embodied on a computer readable medium, with the computer readable medium including floppy disks, mass storage devices such as hard drives, DRAM, CD-ROM, etc. The computer program controls a general purpose computer to perform the method steps noted above.

The invention is discussed above as being implemented on a transmitting computer or device and the data is sent to a receiver or a decoding device. The invention can include configurations wherein the encoding is performed on a computer, wherein encoded image data is transmitted onto the internet for internet browsing, and decoding occurs at another computer retrieving information from the Internet. The encoder and the decoder can also be disposed on a local area network (LAN) or wide area network (WAN), intranet, or can occur between a computer and a mass storage device. Applications could therefore include virtually any applications where image data transfer or storage is necessary, including telemedicine and general image archival and retrieval. The region of interest coding method and apparatus according to the invention solves bottleneck problems which occur in these applications.

The above description of the invention is for illustrative purposes only. It should be understood that the selection and reconstruction of a region of interest according to the present invention can be utilized with other types of compression methods, and that the various means which are disclosed above have numerous equivalents which would be within the scope of knowledge of a person of skill in the art. The metes and bounds of the invention are defined in the appended claims.

What is claimed is:

1. A method of image compression, said method comprising the steps of:
    providing digital image data in a computer-readable format, said digital image data including data on values and coordinates for a plurality of pixels;
    selecting a region of interest of an image represented by said digital image data;
    sorting and prioritizing said digital image data according to at least two priority categories, with digital image data corresponding to the region of interest having a higher priority than digital image data corresponding to areas outside of the region of interest; and
    transmitting said sorted and prioritized digital image data to a remote location with the digital information data corresponding to the region of interest being transmitted with higher priority than the areas outside of the region of interest, wherein said sorting and prioritizing of said digital image data comprises shifting bits of transform coefficients corresponding to the digital image data by a predetermined amount, said predetermined amount of corresponding to a desired scale-up rate for reconstruction of the region of interest.

2. A method for encoding and decoding an image, said method comprising the steps of:
    providing digital image data in a computer-readable format, said digital image data including data on values and coordinates for a plurality of pixels;
    sorting said digital image data according to a mathematical sorting protocol, said digital image data being sorted and prioritized according to a predetermined prioritization formula;
    transmitting said sorted data to a receiver, and repeating said sorting and transmitting until a partial reconstructed image appears on a display at the receiver;
    selecting a region of interest based upon said partial reconstructed image;
    transmitting data from said receiver to a computer transmitting data identifying the selected region of interest;
    modifying the sorting of the digital image data based upon the selected region of interest, wherein digital image data corresponding to the region of interest is sorted and prioritized to have a higher priority than digital image data corresponding to areas outside of the region of interest; and
    transmitting said modified sorted and prioritized data to the receiver with said region of interest being transmitted with higher priority than the areas outside of the region of interest.

3. A method for encoding and decoding an image as recited in claim 2, wherein said step of transmitting said sorted data includes transmitting said sorted data onto a network, wherein said receiver is a receiving computer on said network, and wherein, said step of selecting the region of interest is performed at said receiving computer.

4. A method for encoding and decoding an image as recited in claim 3, wherein said network is an internet network.

5. A system for encoding and decoding an image, said system comprising:

input means for inputting digital image data in computer-readable format with the digital image data including data on values and coordinates for a plurality of pixels for an image;

sorting means for sorting said digital image data according to a mathematical sorting protocol, said digital image data being sorted and prioritized by said sorting means according to a predetermined prioritization formula;

transmitting means connected to said sorting means for transmitting said sorted data, wherein said sorting means repeats a sorting of said digital image data and said transmitting means repeats the transmission of said data;

receiving means for receiving said transmitted data from said transmitting means, wherein said transmitted data, said receiving means including a display means thereupon, said display means displaying said transmitted data as a partial reconstructed image during said transmission;

selecting means connected to said receiving means for selecting a region of interest of said partial reconstructed image;

region-of-interest transmitting means for transmitting data corresponding to said selected region-of-interest to said sorting means;

wherein said sorting means modifies the sorting of the digital image data based upon the data corresponding to the selected region of interest, wherein digital image data corresponding to the selected region of interest is sorted and prioritized by said sorting means to have a higher priority than digital image data corresponding to areas outside of the selected region of interest, and wherein said transmitting means transmits said modified sorted and prioritized data to the receiving means, with said selected region of interest being transmitted with a higher priority than areas outside of the region of interest.

6. A system for encoding and decoding an image as recited in claim 5, wherein said transmitting means transmits said sorted data onto a network, and wherein the receiving means is a receiving computer on said network.

7. A computer program embodied on a computer readable medium, said computer program controlling a general purpose computer to perform the steps of:

displaying digital image data on a display, said digital image data including data on values and coordinates for a plurality of pixels;

sorting said digital image data according to a mathematical sorting protocol, said digital image data being sorted and prioritized according to a predetermined prioritization formula;

transmitting said sorted data to a receiver, and repeating said sorting and transmitting until a partial reconstructed image appears on a display at the receiver;

selecting a region of interest based upon said partial reconstructed image;

transmitting data from said receiver to a computer transmitting data identifying the selected region of interest;

modifying the sorting of the digital image data based upon the selected region of interest, whereby digital image data corresponding to the region of interest is sorted and prioritized to have a higher priority than digital image data corresponding to areas outside of the region of interest; and transmitting said modified sorted and prioritized data to the receiver, with said region of interest being transmitted with higher priority than the areas outside of the region of interest.

8. A method of image compression, said method comprising the steps of:

providing digital image data in a computer-readable format, said digital image data including data on values and coordinates for a plurality of pixels;

sorting and prioritizing said digital image data according to a mathematical sorting protocol, said digital image data being sorted and prioritized according to a predetermined prioritization formula;

transmitting said sorted data to a receiver, and repeating said sorting and transmitting as the image data is transmitted to the receiver;

selecting a region of interest of said digital image data;

modifying the sorting of the digital image data based upon the selected region of interest, wherein digital image data corresponding to the region of interest is sorted and prioritized to have a higher priority than digital image data corresponding to areas outside of the region of interest; and transmitting said modified and sorted prioritized data to the receiver, with said region of interest being transmitted with higher priority than the areas outside of the region of interest.

9. A method of image compression said method comprising the steps of:

providing digital image data in a computer-readable format, said digital image data including data on values and coordinates for a plurality of pixels;

selecting a region of interest of an image represented by said digital image data;

sorting and prioritizing said digital image data according to at least two priority categories, with digital image data corresponding to the region of interest having a higher priority than digital image data corresponding to areas outside of the region of interest; and transmitting said sorted and prioritized digital image data to a remote location, with the digital information data corresponding to the region of interest being transmitted with higher priority than the areas outside of the region of interest, wherein said step of transmitting said sorted and prioritized digital image data to the remote location includes transmitting the sorted and prioritized digital image data onto an internet, wherein said remote location is a location on the internet, wherein said method further comprises the step of reconstructing the transmitted digital image data at the remote location, said step of reconstructing comprising the step of decoding the sorted and prioritized digital image data, wherein the region of interest is reconstructed at a faster rate than digital image data corresponding to areas outside of the region of interest, said faster rate being provided by said sorting and prioritizing of said digital image data corresponding to the region of interest.

* * * * *